(12) United States Patent
Kropp et al.

(10) Patent No.: US 6,520,688 B2
(45) Date of Patent: Feb. 18, 2003

(54) COUPLING ELEMENT

(75) Inventors: Jörg-Reinhardt Kropp, Berlin (DE); Karen Klimke, Falkensee (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/941,904

(22) Filed: Aug. 29, 2001

(65) Prior Publication Data

US 2002/0067896 A1 Jun. 6, 2002

(30) Foreign Application Priority Data

Aug. 29, 2000 (DE) .......................... 100 43 353

(51) Int. Cl.⁷ .............................................. G02B 6/36
(52) U.S. Cl. ........................................... 385/88; 385/14
(58) Field of Search .............................. 385/88–94, 14, 385/40, 39, 27

(56) References Cited

U.S. PATENT DOCUMENTS 5,195,154 A * 3/1993 Uchida .......................... 385/88
6,428,216 B1 * 8/2002 Savage, Jr. .................... 385/88

FOREIGN PATENT DOCUMENTS

DE 29 10 909 10/1979
EP 1 028 338 A2 8/2000

OTHER PUBLICATIONS

Rosenberg et al.: "The PONI–1 Parelle–Optical Link", 1999 IEEE Electronic Components and Technology Conference, pp. 763–769.

* cited by examiner

Primary Examiner—Phan T. H. Palmer
(74) Attorney, Agent, or Firm—Laurence A. Greenberg; Werner H. Stemer; Gregory L. Mayback

(57) ABSTRACT

A coupling element for optical coupling of at least one optoelectronic transducer to at least one optical wave guide, with a coupling element having an image plate with a large number of small-diameter optical wave guides. Accordingly, the image plate is connected to a guide element (21) for coupling the at least one optical wave guide. This allows an optical coupling in a simple and effective manner between at least one optoelectronic transducer and at least one optical wave guide, in which case a mount, which may be of any desired form, can be used for mounting and making electrical contact with the optoelectronic transducer.

18 Claims, 3 Drawing Sheets

COUPLING ELEMENT

BACKGROUND OF THE INVENTION

Field of the Invention

The invention relates to a coupling element for optical coupling of at least one optoelectronic transducer to at least one optical wave guide. Coupling elements such as these are particularly suitable for coupling transmitting and receiving elements, which are disposed closely adjacent to one another, to optical wave guides via closely adjacent optical channels. The coupling element has an image plate with a large number of small-diameter optical wave guides.

It is known for coupling elements to be used for coupling an optical wave guide to an optoelectronic transducer, for example a receiving diode or a VCSEL laser. The coupling elements form an optical interface between the optoelectronic transducers and the optical wave guides. Normally, this interface is formed by a plug-in system of plug connectors, with the optical coupling being provided by lenses or wave guide stubs. In some cases, adjustment of the individual components is complex, and hence costly.

The publication titled "The PONI-1 Parallel-Optical Link", Proc. 49th ECTC 1999, pages 763–769 discloses a mounting block, on which a number of optoelectronic transducers are mounted. The mounting block has a pair of guide pins, which provide guidance for an optical connector that is to be coupled. The optical coupling between the optoelectronic transducers and the wave guides in the connector is provided by an image plate having a large number of optical microwave guides, with the image plate being disposed above the optoelectronic transducers.

The optical microwave guides are in the form of thin glass fibers, which provide optical channels with a diameter of, for example, 10 micrometers. The image plate allows optical signals to be transmitted from its input to its output essentially without any divergence. The image plate thus transmits the light between an array of optoelectronic transducers and a corresponding array of optical wave guides, while maintaining the respective pattern. This makes it possible to save an adjustment step, since the image plate does not need to be finely adjusted with respect to the optoelectronic transducers and the optical wave guides to be coupled. All that is required is to position the optical wave guides and the optical wave guide connectors accurately with respect to the optoelectronic transducers.

A further advantage of the use of an image plate is that it protects the optoelectronic transducers against direct contact with the optical wave guides to be coupled and an optical wave guide connector.

The known configuration using an image plate has the disadvantage however, that the optical connectors to be coupled are positioned with respect to the mounting block via the guide pins on the mounting block. It is thus necessary to provide mounting blocks with different configurations of guide pin configurations for different connectors and optical wave guide systems to be coupled, that is to say the mounting blocks must be configured differently.

SUMMARY OF THE INVENTION

It is accordingly an object of the invention to provide a coupling element that overcomes the above-mentioned disadvantages of the prior art devices of this general type, which provides optical coupling in a simple and effective manner between the elements, and with the aim of avoiding any restriction with regard to the mount which can be used for the mounting of the optoelectronic transducers.

With the foregoing and other objects in view there is provided, in accordance with the invention, a coupling element for optical coupling at least one optoelectronic transducer to at least one optical wave guide. The coupling element contains a guide element and an image plate with a large number of small-diameter optical wave guides. The image plate is connected to the guide element and couples the at least one optical wave guide.

The solution according to the invention is accordingly distinguished by the fact that the image plate is connected to the guide element for coupling the at least one optical wave guide. According to the invention, the guide element is thus not attached to the mounting block with the optoelectronic transducers, but are attached to the image plate itself. This allows any desired mount to be used for mounting and making electrical contact with the optoelectronic transducers. All that is required is to connect the combination of the image plate and the guide element to the optical conductors to be coupled, and then to fix and adjust the configuration with respect to the optoelectronic transducers.

There are a large number of options for connecting the guide element to the image plate, which may be carried out directly or indirectly via intermediate elements. For example, the guide element can be firmly connected to the image plate, in particular being bonded or soldered to it. Furthermore, it is possible to provide for the image plate to have holding elements for attaching the guide elements. The holding elements are, for example, longitudinal grooves on the image plate.

It is likewise within the scope of the invention for the image plate and the guide device to be connected by a frame that at least partially surrounds them. Alternatively, the image plate is embedded in a holding plate, and the guide element is likewise attached to the holding plate.

The image plate and the guide element are advantageously elastically connected to one another. For this purpose, the invention provides, for example, for the above-mentioned frame to have a sprung configuration for a holding plate that connects the image plate and the guide elements to one another to have elastic characteristics. The elastic connection of the image plate and guide element also ensures, in the case of manufacturing tolerances, that an optical wave guide or connector to be coupled can be reliably coupled to the guide device.

One preferred embodiment to the invention relates to the coupling of the optical wave guides that are disposed in at least one optical connector to be coupled. The guide element is in this case used for coupling the optical connector. For this purpose, they are, in particular, in the form of pins or holding openings for holding and guiding the optical connector. By way of example, they form a circular or rectangular holding opening for an optical wave guide connector.

It is likewise within the scope of the invention, however, for the optical wave guide to be disposed on or in a mount, for example on a printed circuit board and/or in a wave guide plane, and to be coupled at the end to the optoelectronic transducers, without using optical connectors. In this case, the guide element preferably is guided in the mount. In particular, the guide element preferably engages in grooves in the wave guide plane, in which a number of optical wave guides are disposed, in order to fix and couple the wave guides.

In a further preferred refinement to the invention, the image plate and the at least one optoelectronic transducer are at least partially jointly encased by an optically transparent encapsulation compound. This results in the optoelectronic transducers and the image plate are encapsulated from the environment, and are protected against moisture, dirt, etc. In particular, this ensures that the optical path between the optoelectronic transducers and the image plate runs in a protected manner within the encapsulation compound.

Other features which are considered as characteristic for the invention are set forth in the appended claims.

Although the invention is illustrated and described herein as embodied in a coupling element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
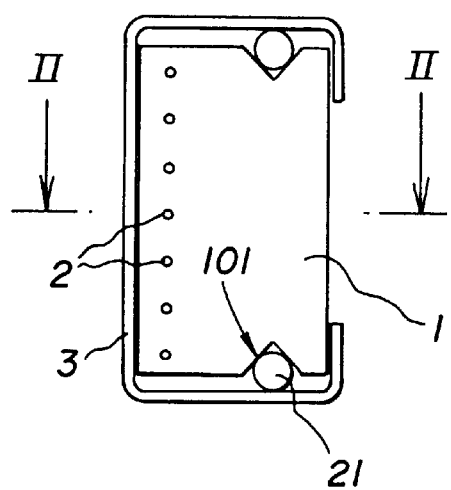
FIG. 1 is a diagrammatic, plan view of an image plate with guide pins according to the invention.

In all the figures of the drawing, sub-features and integral parts that correspond to one another bear the same reference symbol in each case. Referring now to the figures of the drawing in detail and first, particularly, to FIG. 1 thereof, there is shown an image plate 1, which contains a large number of mechanically robust, thin glass fibers 2 which form optical channels with a diameter of about 10 micrometers. The image plate 1 optically connects structures that make optical contact with the ends of the image plate 1 or of the glass fibers 2, without light beams converging or diverging within the image plate 1.

The image plate 1 has two V-shaped longitudinal grooves 101, in each of which a guide pin 21 is disposed, as a guide structure. The guide pins 21 ensure that an optical wave guide connector that is to be coupled is guided and fixed. In order to fix the guide pins 21 on the image plate 1, the image plate 1 and the guide pins 21 are surrounded by a frame 3.

Figure 2:
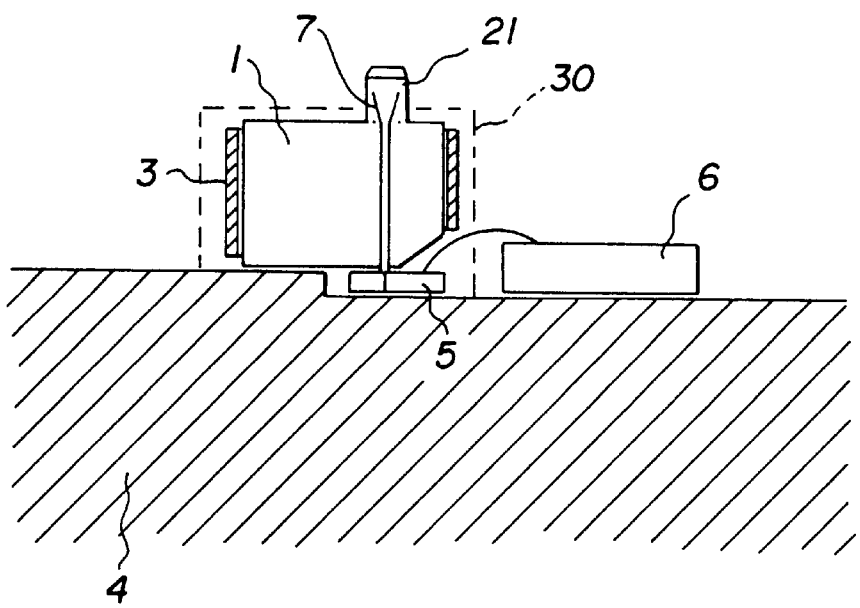
FIG. 2 is a sectional view of a configuration with a mount, an optoelectronic transducer and the image plate from FIG. 1, with the image plate being illustrated in the form of a section along the line II—II shown in FIG. 1.

FIG. 2 shows the configuration from FIG. 1 in conjunction with a mounting element 4. An optoelectronic transmitting or receiving element 5 is mounted on the mounting element 4. The transmitting or receiving element 5 is, for example, a chip 5 with an array of optoelectronic transducers, such as VCSEL lasers or receiving diodes. By way of example, twelve transducers are disposed alongside one another on the chip 5, with an interval of 250 micrometers between each of them.

The transmitting or receiving element 5 is actuated via a control module 6, which is likewise disposed on the mounting element 4.

The image plate 1 in FIG. 1 together with the guide pins 21 is disposed above the transmitting or receiving element 5. Once the adjustment process has been carried out, it is firmly connected to the mounting element 4. Corresponding to the array of optoelectronic transducers in the transmitting or receiving element 5, the image plate 1 has a number of closely adjacent optical channels, via which light signals are transmitted, in each case without any divergence, between the transducers in the transmitting or receiving element 5 and optical wave guides that are to be coupled. The light diverges only when it emerges from the image plate 1, as is illustrated schematically by light beams 7 in FIG. 2.

An optically transparent encapsulation 30 (shown by dashed lines) is preferably provided between the transmitting or receiving element 5 and the image plate 1 and may completely encase the transmitting or receiving element 5. The optical encapsulation 30 is used to protect the transmitting or receiving element 5, and provides a protective optical path between the transmitting or receiving element 5 and the image plate 1.

All that is required for optical coupling is for the optical wave guides to be coupled or an optical wave guide connector and the transducers of the transmitting or receiving element 5 to be positioned exactly one above the other. Since a connector that is to be coupled is fixed with respect to the image plate 1 by the guide pins 21, the image plate 1 just needs to be fixed, in this case, with respect to the transmitting or receiving element 5 by the guide pins 21. Only one adjustment step is therefore required.

Figure 3:
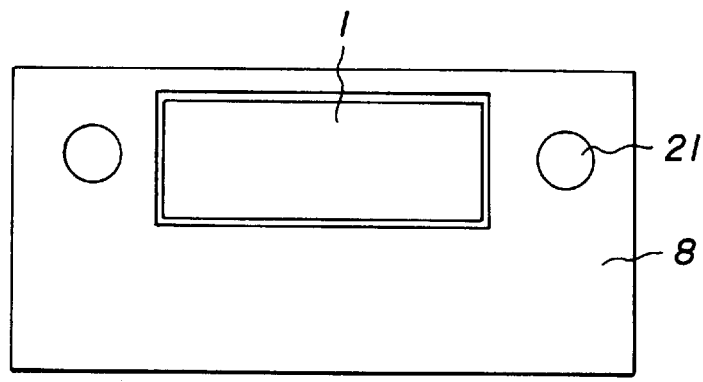
FIG. 3 is a plan view of an alternative refinement of the image plate with guide pins.

FIG. 3 shows an alternative embodiment of the image plate 1 with the guide pins 21. In this case, the image plate 1 is embedded in a holding plate 8, for example a plastic plate 8. The guide pins 21 are attached to the holding plate 8, for example being bonded into it. The holding plate 8 provides a structure for connecting the image plate 1 to the guide pins 21.

Figure 4:
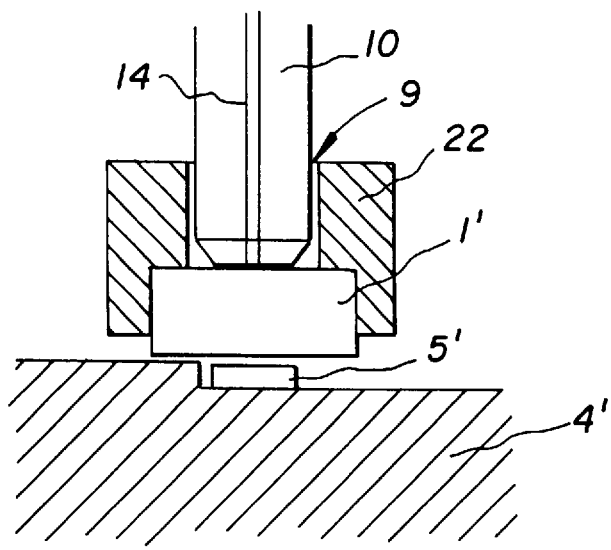
FIG. 4 is a sectional view through an alternative configuration of a mount with the optoelectronic transducer and the image plate, with a guide device forming a holding opening for a connector.

FIG. 4 shows an exemplary embodiment, in which the guide device, which is connected to the image plate 1, is not formed by the guide pins, but by a guide element 22. In this case, a transmitting or receiving element 5', which has an associated image plate 1', is disposed on a mount 4' in a similar way to that shown in FIG. 2. The image plate 1' is connected (for example by being bonded) to the guide element 22, which forms a holding opening and a connector guide 9 for an optical wave guide connector 10 which is to be coupled.

The guide element 22 is hollow inside and has a lower region with a relatively large internal diameter, in which it encases the image plate 11, and an upper region with a smaller internal diameter, in which it forms the connector guide 9 for the optical wave guide connector 10.

The optical wave guide connector 10 to be coupled is, for example, a ceramic ferrule, in whose center one or more optical wave guides 14 is or are embedded. In order to produce an optical coupling between the optical wave guide 14 or the connector 10 and the transmitting or receiving element 5', the optical wave guide connector 10 is inserted into the guide element 22. This results in what is referred to as a physical contact between the optical wave guide 14 and the image plate 1', that is to say the elements touch one another directly. This very largely avoids any backward reflection when light is coupled into the respective other element.

The configuration is then adjusted and fixed together with the image plate 1' with respect to the transmitting or receiving element 5'.

When different connectors are used, the guide element 22 is adapted as appropriate, without any need to modify the configuration of the mount 4' and the transmitting or receiving element 5'.

Figure 5:
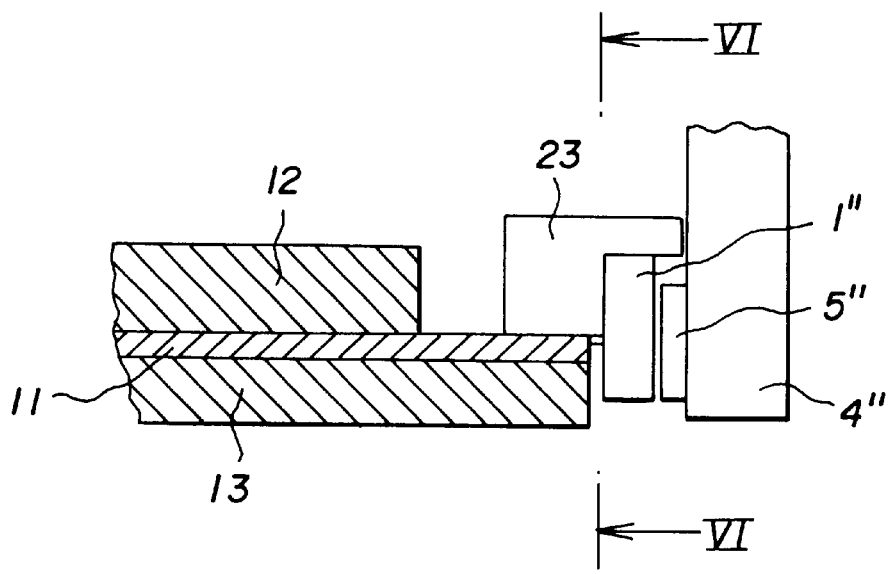
FIG. 5 shows a partially cut-away view of a configuration with the mount, the optoelectronic transducer and the image plate, with the optical wave guides to be coupled being disposed in a wave guide plane.
Figure 6:
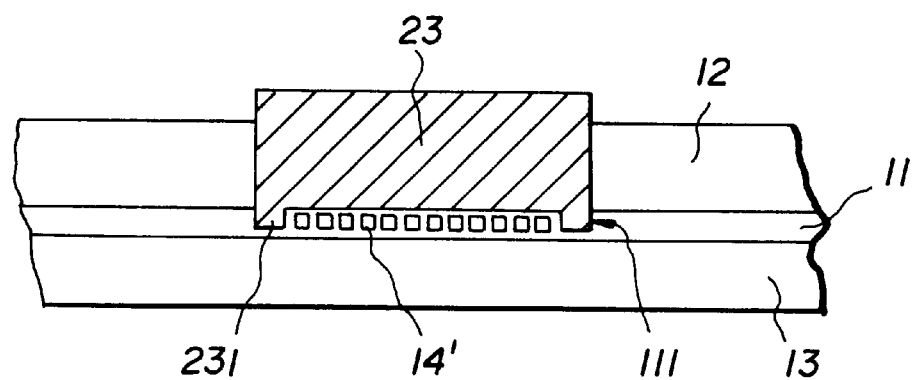
FIG. 6 is a partially cut-away view of the configuration shown in FIG. 5, taken along the line VI—VI.

FIGS. 5 and 6 show one embodiment of the invention, in which the optical wave guides are not coupled to a transmitting or receiving element via an optical connector, but are coupled directly. A large number of optical wave guides 14' (see FIG. 6) are in this case embedded in a wave guide plane 11, which runs between two printed circuit board planes 12, 13 in FIGS. 5 and 6. Such a configuration of the optical wave guides 14' is known per se. The light to be input or output in this case enters or emerges from the wave guide plane 11 at the end.

As shown in FIG. 5, the optical wave guides 14' are positioned immediately in front of an image plate 1", to which a transmitting or receiving element 5", which is disposed on a mount 4", is connected in a manner corresponding to that shown in FIGS. 1 and 4. A guide element 23, which is connected to the image plate 1", is provided for coupling and fixing the wave guide plane 11 to the image plate 1". Elongated guides 231 are for this purpose formed on the guide element 23, and engage in corresponding grooves 111 in the surface of the wave guide plane 11 (see FIG. 6).

The image plate 1" is also used to protect the transmitting or receiving element 5" against the structure 11, 12, 13 to be coupled.

For adjustment, the wave guide plane 11 together with the wave guides 14' are fixed with respect to the image plate 1" by the guide element 23, and the entire configuration is then adjusted with respect to the transmitting or receiving element 5", and is then fixed. As is indicated in FIG. 5, the guide element 23 is fixed on the mount 4" in order to fix the configuration with respect to the transmitting or receiving element 5".

The configuration of the invention is not restricted to the exemplary embodiments described above. The only essential factor for the invention is that, in the case of an optical coupling element with the image plate 1, the image plate 1 is connected to the guide device for coupling at least one optical wave guide or for coupling at least one optical wave guide connector.

We claim:

1. A coupling element for optical coupling at least one optoelectronic transducer to at least one optical wave guide, comprising:

a guide element; and
   an image plate with a large number of small-diameter optical wave guides, said image plate connected to said guide element and coupling the at least one optical wave guide.

2. The coupling element according to claim 1, wherein the at least one optical wave guide is disposed in an optical connector, and said guide element is configured for coupling the optical connector.

3. The coupling element according to claim 2, wherein said guide element is structured for holding the optical connector.

4. The coupling element according to claim 3, wherein said guide element has an opening formed therein for holding and guiding the optical connector.

5. The coupling element according to claim 4, wherein said opening is an opening selected from the group consisting of circularly shaped openings and rectangularly shaped openings.

6. The coupling element according to claim 1, wherein the at least one optical wave guide is disposed one of on and in a mount and being optically coupled at an end facing the at least one optoelectronic transducer, said guide element has a guide structure for engaging in the mount.

7. The coupling element according to claim 6, wherein the mount has a wave guide plane with grooves formed therein, the at least one optical wave guide being one of a plurality of optical wave guides disposed in the wave guide plane, and said guide element engages in the grooves on the wave guide plane.

8. The coupling element according to claim 1, wherein said guide element is in a form of guide pins.

9. The coupling element according to claim 1, wherein said image plate has at least one of holders and holding elements for attaching said guide element to said image plate.

10. The coupling element as claimed in claim 1, wherein said image plate has longitudinal grooves formed therein for holding said guide element.

11. The coupling element according to claim 1, including a frame at least partially surrounding said image plate and said guide element, said image plate and said guide element are connected to one another by said frame.

12. The coupling element according to claim 1, including a holding plate and said image plate is embedded in said holding plate, and said guide element is attached to said holding plate.

13. The coupling element according to claim 1, wherein said image plate and said guide element are elastically connected to one another.

14. The coupling element according to claim 1, including an optically transparent encapsulation at least partially encasing said image plate and the at least one optoelectronic transducer.

15. The coupling element according to claim 1, wherein said guide element is bonded to said image plate.

16. The coupling element according to claim 1, wherein said guide element is soldered to said image plate.

17. The coupling element according to claim 1, wherein said image plate has V-shaped longitudinal grooves formed therein for holding said guide element.

18. The coupling element according to claim 1, wherein said guide element is firmly connected to said image plate.

* * * * *